US006757655B1

(12) United States Patent
Besling et al.

(10) Patent No.: US 6,757,655 B1
(45) Date of Patent: Jun. 29, 2004

(54) METHOD OF SPEECH RECOGNITION

(75) Inventors: Stefan Besling, Aachen (DE); Eric Thelen, Aachen (DE); Meinhard Ullrich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/385,634

(22) Filed: Aug. 27, 1999

(30) Foreign Application Priority Data

Mar. 9, 1999 (DE) .......................................... 199 10 236

(51) Int. Cl.[7] .............................................. G10L 15/04
(52) U.S. Cl. ..................... 704/270.1; 704/251; 709/229
(58) Field of Search ............................. 704/270.1, 275, 704/271, 272, 251, 231; 709/203, 205, 226

(56) References Cited

U.S. PATENT DOCUMENTS

| | | | | |
|---|---|---|---|---|
| 5,513,298 A | * | 4/1996 | Stanford et al. ............. 704/243 |
| 5,710,918 A | * | 1/1998 | Lagarde et al. ............. 395/610 |
| 5,765,179 A | | 6/1998 | Sumita et al. |
| 5,884,266 A | * | 3/1999 | Dvorak ....................... 704/275 |
| 5,890,123 A | * | 3/1999 | Brown et al. ................ 704/235 |
| 5,915,001 A | * | 6/1999 | Uppaluru .................. 704/270.1 |
| 5,956,683 A | * | 9/1999 | Jacobs et al. ............... 704/275 |
| 5,960,399 A | * | 9/1999 | Barclay et al. ............. 704/270 |
| 6,112,176 A | * | 8/2000 | Goldenthal et al. ......... 704/257 |
| 6,115,686 A | * | 9/2000 | Chung et al. ............... 704/260 |
| 6,122,613 A | * | 9/2000 | Baker ......................... 704/235 |
| 6,157,705 A | * | 12/2000 | Perrone .................... 379/88.01 |
| 6,173,259 B1 | * | 1/2001 | Bijl et al. ................... 704/235 |
| 6,233,559 B1 | * | 5/2001 | Balakrishnan ........... 704/270.1 |

FOREIGN PATENT DOCUMENTS

GB 2323693 A 9/1998
WO WO9834217 8/1998

OTHER PUBLICATIONS

Method of Establishing Connections in the Client–Server Model of Tangora; IBM Technical Disclousere Bulletin, Feb. 1993, US, vol. 36; Issue 2; pp. 353–354.*

* cited by examiner

*Primary Examiner*—Richemond Dorvil
*Assistant Examiner*—Abul K. Azad

(57) ABSTRACT

In a method in which an information unit (4) enabling a speech input is stored on a server (5) and can be retrieved by a client (1, 2, 3) and in which the client can be coupled to one or more speech recognizers (7, 8, 9) through a communications network (6), the information unit (4) is assigned additional information (12) which is provided for determining a combination of a client (1, 2, 3) for recognizing an uttered speech signal and at least one of the speech recognizers (7, 8, 9), to dynamically assign the speech recognizers (7, 8, 9) in a communications network (6) to the information units (4) and thus ensure an acceptable processing time for the recognition of a speech input with a high recognition quality.

13 Claims, 3 Drawing Sheets

METHOD OF SPEECH RECOGNITION

BACKGROUND OF THE INVENTION

1. Field of the Invention

The invention relates to a method in which an information unit enabling a speech input is stored on a server and can be retrieved by a client and in which the client can be coupled to a speech recognizer through a communications network.

2. Description of the Related Art

The possibility of carrying out the communication with a computer by speech input instead of keyboard or mouse, unburdens the user in his work with computers and often increases the speed of input. Speech recognition can be used in many fields in which nowadays input is effected by means of a keyboard. Obviously, the issues may be of a most varied nature. On the other hand, during the speech recognition strict requirements are made on the computational power, which is often not sufficiently available on local computers (clients). Particularly for speaker-independent speech recognition with a large vocabulary, the computational power of the clients is often insufficient. In order to make a reliable and fast speech recognition of speech inputs possible, it is advisable to carry out the speech recognition on a specialized speech recognizer which is run on a powerful computer.

EP 0 872 827 describes a system and a method of speech recognition. A client on which compressed software for speech recognition is executed is connected to a speech recognition server through a network. The client sends a speech recognition grammar and the data of the speech input to the speech recognition server. The speech recognition server executes the speech recognition and returns the recognition result to the client.

A disadvantage in client/server speech recognition systems described in the opening paragraph is that HTML pages (Hyper-Text Markup-Language) are accessed simultaneously by various users and the speech recognizers are fully loaded by the resultant various speech inputs, so that the speech recognition requires an unacceptable processing time.

SUMMARY OF THE INVENTION

Therefore, it is an object of the invention to ensure an acceptable processing time with a high recognition quality for the recognition of a speech input.

This object is achieved in that the client can be coupled to a plurality of speech recognizers and additional information is assigned to the information unit, which additional information is used for determining a combination of a client with at least one of the speech recognizers for recognizing a speech signal that has been entered.

A client downloads an information unit from a server connected through the communications network, for example, the Internet. This information unit is stored on the server and offers a user the possibility of speech input. A server is a computer in a communications network, for example, the Internet, on which information is stored from providers that can be retrieved by clients. A client is a computer which is connected to a server for retrieving information from the Internet and downloads the information unit stored on the server to represent the information unit by means of software. Since the client has limited computation power, the speech recognition is not effected on the client, but on a speech recognizer which is connected to the client through the communications network. For combining the client with a specialized speech recognizer, the server assigns additional information to the information unit stored on the server. This additional information is combined with the information unit and is co-transferred to the client during the downloading. With the aid of the additional information, the information unit is assigned a speech recognizer specially attuned to this downloaded information unit, which speech recognizer then executes the speech recognition.

The additional information is issued by the server in accordance with a predefined criterion such as, for example, theme area, type of speech recognizer or full utilization of the speech recognizers. As a result, a special speech recognizer is selected for each downloaded information unit, which performs the speech recognition of the speech input with a high quality and short processing time.

This has the advantage that the provider of the information unit, who knows the vocabulary to be expected, selects a speech recognizer and combines this speech recognizer with this information unit. The quality of the recognition of the speech input can be considerably increased by means of a provider-controlled assignment of a speech recognizer, because always similar speech inputs can be expected with regard to the respective information unit stored on the server by the provider. With regard to speech recognizers determined by the user, these speech recognizers are to recognize speech entries from a very wide area of application. With this fixed coupling of a speech recognizer to, for example, the Web browser, the speech recognizer is not sufficiently specialized for the wide range of areas of application, so that with this fixed coupling the quality of the recognition result is influenced in a negative way.

The additional information preferably contains the address of the special speech recognizer in the communications network. Furthermore, the additional information contains optional indications about the employment of the recognition result. In the most simple case, the recognition result is returned to the client and produced there as text or speech. Besides, this additional information contains optional indications in which the type of speech recognizer to be used is accurately specified. The additional information can furthermore contain, for example, the vocabulary or parameters to adapt the speech recognizer to the speech input and carry out an adaptation to this speech recognizer. The optional transfer of further parameters improves the speed and/or quality of the speech recognition.

In an advantageous embodiment of the invention there is provided to have the address of a distributor indicated in the additional information. This distributor controls a plurality of speech recognizers. Belonging thereto are, for example, a plurality of speech recognizers of the same type, or groups of speech recognizers which are provided only for recognizing simple speech utterances, such as digits or "Yes/No". The distributor assigned by means of the additional information assigns the speech signals coming from a plurality of clients to the speech recognizers available to them. As a result, not only is there ensured a faster processing of the speech inputs, but also a uniform full load of the speech recognizers.

As a further embodiment of the invention, there is proposed that the clients download the information units in the form of HTML pages from a server. These HTML pages are shown by means of a Web browser on the client or by means of another application suitable for displaying them. The information units could also be realized as Web pages. For downloading this HTML page, the client sets up a connection to the server on which this HTML page is stored. During the downloading, the data are transmitted to the client in the form of the HTML code. This HTML code contains the additional information which is realized, for example, as an HTML tag. This downloaded HTML page is shown by the Web browser and the user can input speech. The co-transmitted HTML tag defines the speech recognizer provided for recognizing the speech input. For the recognition of a speech input, the client sets up a connection to the speech recognizer through a communications network. The speech input is transmitted to the speech recognizer, recognized there and the result of the recognition is returned, for example, to the client.

In an advantageous embodiment of the invention, when a plurality of clients access an HTML page, an individual HTML tag is assigned to each individual client. For this purpose, the server assigns different addresses of speech recognizers to the HTML tags when a plurality of clients access the respective HTML page. This achieves that when there are many accesses to an HTML page, a plurality of speech recognizers can process the speech inputs and thus a faster recognition is ensured. When users from different time zones perform accesses, speech recognizers from the respective time zone can be assigned. When distributors described above are used for assigning speech recognizers, the HTML tags state different addresses of distributors when a plurality of clients access one HTML page, if the speech recognizers controlled by the distributor do not meet the quality requirements during speech recognition.

In a preferred further embodiment of the invention there is provided to have the speech input preprocessed on the client by means of additional software. This additional software may be downloaded from the respective server when an HTML page based on speech input is downloaded. It is alternatively possible to integrate the additional software as an option in the Web browser or to locally install it on the client. This additional software is started when a respective HTML page is downloaded and extracts features of the speech input when the user inputs speech. The speech input available as an electric signal is digitized, quantized and subjected to respective analyses which produce components which are assigned to feature-vectors. After the client has set up a connection to the speech recognizer laid down in the HTML tag, or to the distributor, the feature vectors are transmitted to the speech recognizer or to the distributor through the communications network. The speech recognizer carries out the computation-intensive recognition. As a result of the extraction of the features carried out on the client, the speech input is compressed and coded, so that the number of data to be transmitted is reduced. Furthermore, the time taken up by the feature extraction on the side of the client is reduced, so that the speech recognizer only effects the recognition of feature vectors applied thereto. This reduction may be advantageous with speech recognizers that are used frequently.

In a further embodiment of the invention there is provided to give the HTML tag indications which inform the speech recognizer or the distributor of how the recognition result is to be used. These indications may determine whether the recognized speech input is to be returned to the client or to the server. When returned to the server, for example, a further HTML page could be sent from the server to the client. The recognition result returned to the client may also be derived from the recognized text in accordance with certain criterions.

The invention also relates to a server on which an information unit is stored that can be retrieved by a client, which client can be coupled to one or more speech recognizers, where additional information is assigned to the information unit to establish a combination between the client and a speech recognizer for recognizing an input speech signal.

Furthermore, the invention also relates to a client which can be coupled to one or more speech recognizers through a communications network and which is provided for retrieving an information unit stored on a server and where additional information is assigned to the information unit to establish a combination between the client and a speech recognizer for recognizing an input speech signal.

BRIEF DESCRIPTION OF THE DRAWINGS

Examples of embodiment of the invention will be further explained in the following with reference to the drawings, in which.

DETAILED DESCRIPTION OF THE PREFERRED EMBODIMENT

Figure 1:
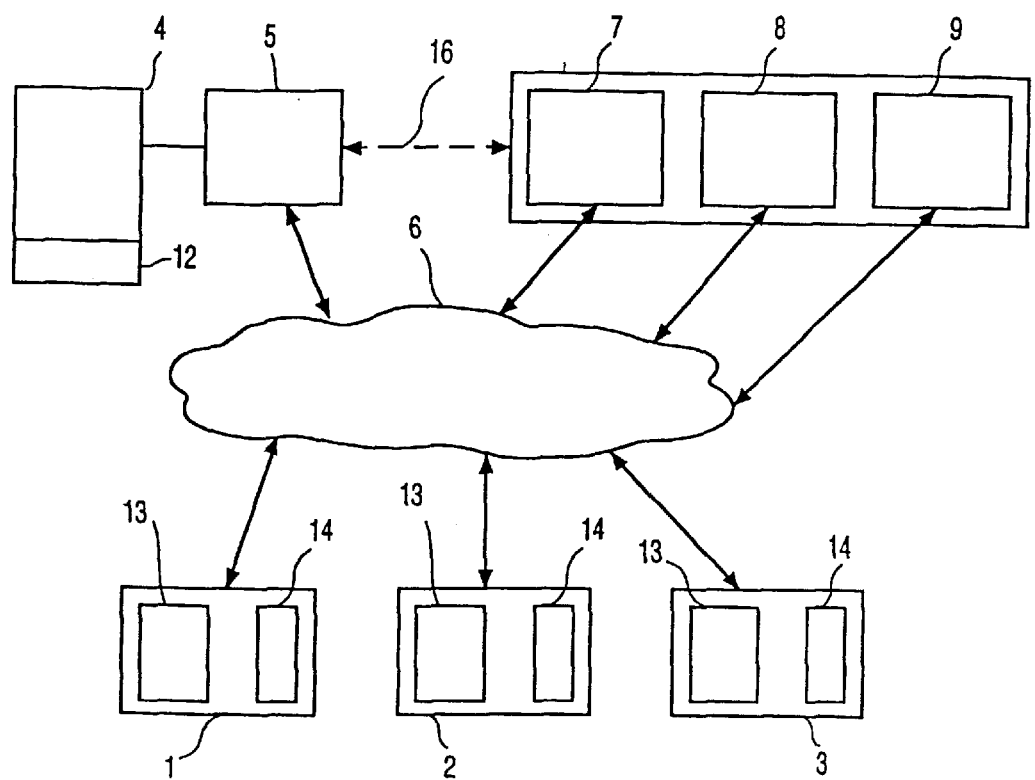
FIG. 1 gives a diagrammatic representation of an assignment of the speech recognizer, FIG. 2 gives a diagrammatic representation of an assignment of the speech recognizers with a distributor, and FIG. 3 gives a diagrammatic representation of an access of various clients to an HTML page and the assignment of the speech recognizers.

FIG. 1 shows an arrangement for implementing a method of speech recognition. Clients 1, 2 and 3 are connected to a server 5 through a communications network 6. From this server 5, the clients 1, 2 and 3 download information units 4 in the form of HTML pages 4. These HTML pages 4 are displayed on the clients 1, 2 and 3 by means of a Web browser 13. The HTML page 4 requested by the client 1–3 is stored on the server 5. Contents of the information unit 4, which a service provider would like to inform a user of, are transmitted by the server 5 to the clients 1, 2 or 3 by means of an HTML code. This HTML-coded data stream contains formatting instructions and additional information 12, for example, in the form of an HTML tag 12 in addition to the contents to be displayed.

The HTML page 4 offers the user the possibility of inputting speech while the contents of the displayed HTML page 4 need not of necessity be coupled to the contents of the speech input.

The client sets up a connection to the server 5 in that the user invokes or requests the respective HTML page through a link. Prior to the transmission of the HTML page to the client, the server 5 allocates to this HTML page 4 an address of the specialized speech recognizer in the assigned HTML tag 12. The assignment of other details such as a type of speech recognizer 18 to be used, or parameters for the adaptation of the speech recognizer, or details about the use of a recognition result, are assigned to the HTML tag as required.

When an HTML page 4 including an HTML tag 12 is loaded, additional software 14 is started. This additional software 14 executes an extraction of features of the speech input available as an electric signal. The additional software 14 may be part of the Web browser 13 or be locally installed on the client 1, 2 or 3.

The client sets up a connection to the speech recognizer 7, 8 or 9 whose address is indicated in the HTML tag 12. This speech recognizer receives the feature stream which was generated by the additional software 14 and carries out the speech recognition of the speech input. After the speech recognizer 7, 8 or 9 has recognized the speech input, it is returned from the speech recognizer 7, 8 or 9 to the client 1, 2 or 3 and there issued as text or as speech.

In a further embodiment there can be determined, with optional components in the HTML tag 12, how the recognition result is to be used. Besides the return to the clients 1–3, there is the possibility of sending the recognition result to the server 5 and thereafter sending a further HTML page 4, for example, to a client 1–3 (indicated by line 16). For example, the user of the client 1, while reading a daily newspaper displayed as an HTML page 4, can say—"current temperature". This speech input is then sent to the speech recognizer 7–9 assigned in the HTML tag 12 to execute the speech recognition. In the indication about the use of the speech recognition result, the recognized text is not returned to the client 1, but to the server 5. The server 5 then sends the client 1 the indication about the current temperature which may be superimposed as text or output as speech.

Figure 2:
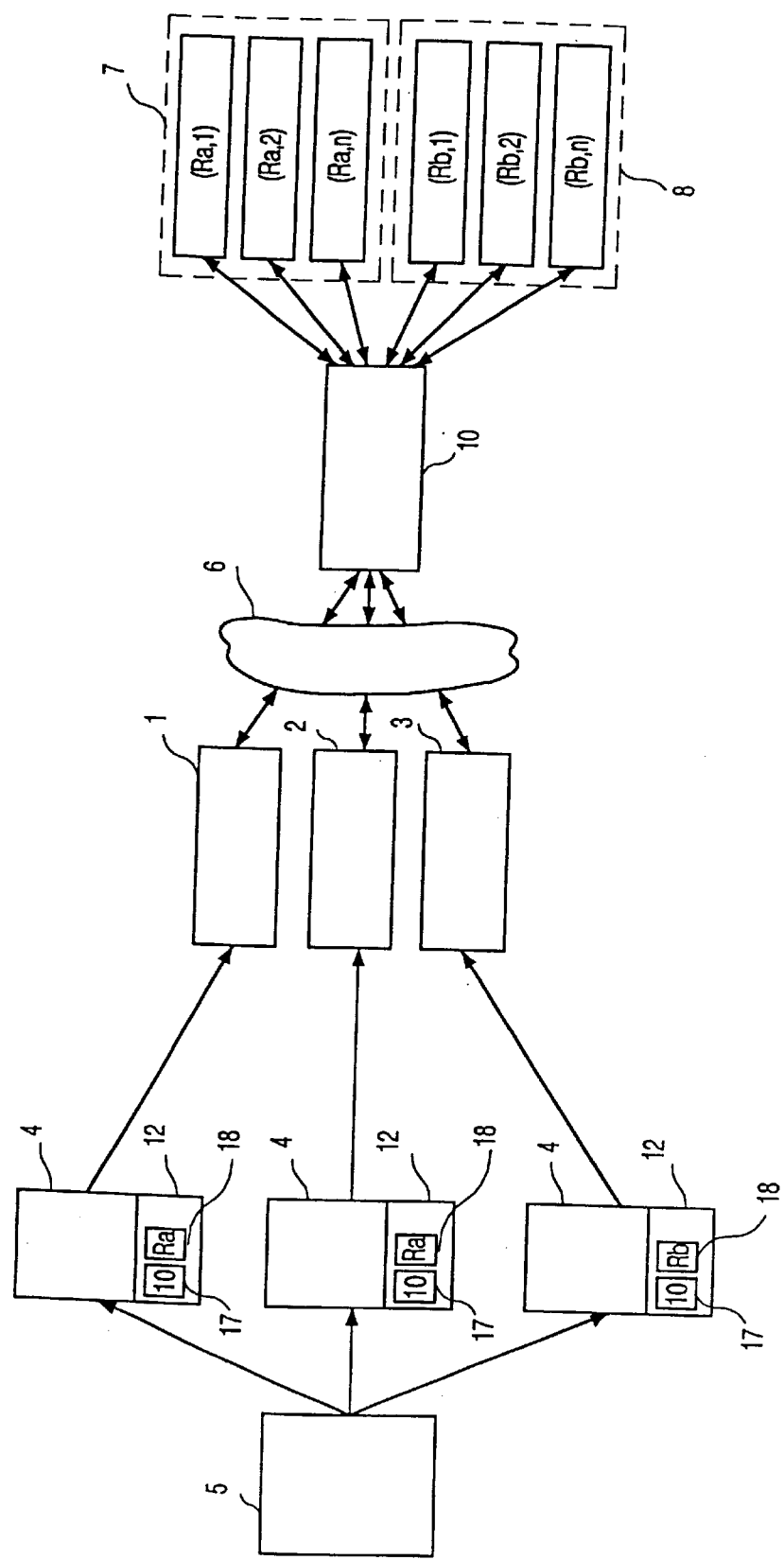

FIG. 2 shows a further example of embodiment. Each client 1–3 downloads from the server 5 an HTML page 4, while the contents of the HTML pages are different. These HTML pages 4 each have an HTML tag 12. This HTML tag 12 contains the address 17 of a distributor 10. In addition to the address 17 of the distributor 10, this HTML tag 12 further contains details about the use of the recognition result, about the type of speech recognizer 18 to be used and/or parameters for the speech recognizer with its adaptation.

The distributor 10 controls various groups of speech recognizers. These speech recognizers may also be of different types. The group 7 includes various speech recognizers Ra,n of a type Ra. The group 8 includes speech recognizers Rb,n of another type Rb. The group 7 of the speech recognizers Ra,n of the type Ra is specialized, for example, in the recognition of digits. The group 8 of the speech recognizers Rb,n of the type Rb is specialized in the recognition of "Yes/No". The distributor 10 distributes incoming speech inputs from the various clients 1–3 according to the types of speech recognizers which are laid down in the respective HTML tags 12.

The HTML pages 4 invoked by the clients 1 and 2 and which are assigned to the distributor 10 can be referred to speech recognizers of the type Ra according to the type of speech recognizer 18 to be used. Speech inputs made by the users of the clients 1 and 2 are assigned to the speech recognizers Ra,n by the distributor 10 of the group 7. The HTML page 4 invoked by the client 3 needs to have a speech recognizer of the type Rb according to the speech recognizer 18. A speech input made by the user of the client 3 is assigned to the speech recognizer of type Rb,n by the distributor 10 of the group 8.

When a speech recognizer Ra,1 is being busy with the processing of a speech input, the distributor 10 leads a next speech input for the same type of speech recognizer Ra to the next speech recognizer Ra,2. The respective recognition result is returned by the speech recognizers R,n to the clients 1–3 and then processed there.

Figure 3:
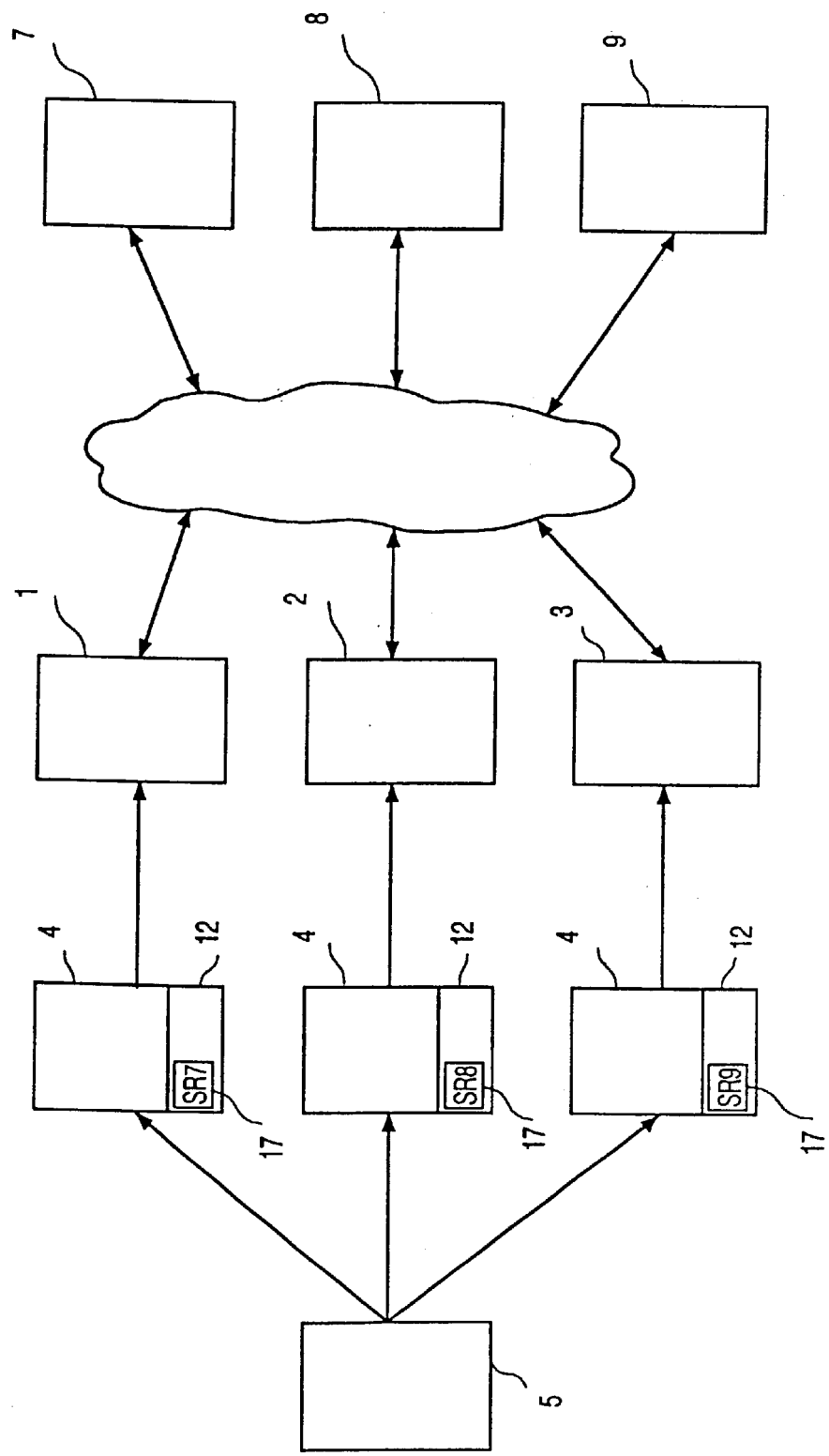

FIG. 3 gives a representation in which a plurality of clients 1–3 access the same HTML page 4. When the HTML pages 4 are displayed by means of the Web browser 13, they show the same contents.

Each HTML tag 12 contains in the address field 17 an IP address and the socket port for a TCP/IP link from the client 1, 2 or 3, to the speech recognizer 7, 8 or 9. Thus the service provider of the HTML page 4 determines in the server 5 a speech recognizer 7, 8 or 9 that is to process the speech uttered by the user. Each time a client 1, 2 or 3 invokes a respective HTML page 4 through the Internet, the HTML page 4 is assigned an HTML tag 12 by the server 5, which tag determines the address 17 of the respective speech recognizer 7, 8 or 9. When an HTML page 4 is simultaneously invoked by various clients 1–3, a fast processing of the various speech inputs would not be guaranteed if there were only a single fixedly defined speech recognizer 7, 8 or 9 for this HTML page 4. Therefore, in such a case, each client 1, 2 or 3 that invokes the respective HTML page 4 is assigned another speech recognizer 7, 8 or 9 by means of different addresses 17 in the respective HTML tags 12. For example, the speech recognizer 7 is assigned to the HTML tag 12 when the HTML page 4 is downloaded by client 1. The speech recognizer 8 is assigned to the client 2 for the speech recognition of a speech input and the speech recognizer 9 is assigned to client 3. This ensures a fast and reliable speech recognition of the speech inputs for all three users (clients 1–3).

An example of an application of the special assignment of speech recognizers will be represented in the following. Client 1 invokes an HTML page 4 about a theatre program. Client 2 invokes an HTML page 4 about a soccer program and client 3 invokes an HTML page 4 about airline connections. Obviously, all three HTML pages 4 have different speech inputs. The service providers of the HTML pages 4 know the vocabulary to be expected and assign a specialized speech recognizer 7, 8 or 9 to each HTML page 4 by means of the associated HTML tag 12.

In the case of HTML pages 4 for which a plurality of speech inputs are possible, for example for filling out a form, different speech recognizers 7, 8 or 9 may be assigned to the respective speech input fields, which recognizers are also laid down in one or a plurality of HTML tags 12. Which speech input is currently processed can be distinguished by means of key words, by establishing the direction which the user looks, how close the mouse is or by priorities the sequential orders.

What is claimed is:

1. A method in which an information unit is stored on a server and can be retrieved by a client through an input of speech and in which the client can be coupled to at least one speech recognizer having a specialized recognition capability associated with the speech input out of a plurality of speech recognizers having predetermined recognition specialties that have been previously assigned by a provider of the information unit and issued by a server on a communications network with an additional identifying information associated with the speech input, said additional identifying information being used for determining a combination of a client with said at least one speech recognizer for recognizing a signal that has been entered, wherein the at least one speech recognizer having an expected recognizable speech vocabulary associated with said information unit, wherein the additional identifying information includes one of a predetermined theme area, an indicator for specifying a speech recognizer, or parameters for allowing a speech recognizer to adapt to the speech input, so that the speech input by the client is recognized by the communication network and the at least one speech recognizer having a specialized recognition capability associated with the speech input are coupled to maximize speed and quality while downloading the information unit associated with the speech input; and combining the additional information and the information unit as a combined information unit and co-transferring combined information unit during downloading so that the information unit is assigned a speech recognizer specially attuned to the downloaded combined information unit;

wherein the client is able to input speech before the contents of the information unit is coupled to the contents of the speech input, and wherein if more than one client invokes a same speech recognizer, at least one of the clients is assigned another speech recognizer according to alternative addresses of recognizers stored in a tag in the information unit.

2. A method as claimed in claim 1, wherein the additional information contains in addition to an address for assigning the at least one speech recognizer, indications about the processing of the recognition result and/or type of speech recognizer and/or parameters to be transported to the speech recognizer for its adaptation.

3. A method as claimed in claim 1 wherein the additional information is assigned to the information unit by the server.

4. A method as claimed in claim 1, wherein the information unit with the assigned additional information is loaded by the client.

5. A method as claimed in one or more of the claims 1 to 4, wherein an input speech signal is transported for recognition from the client to the address of the at least one speech recognizer, which address is indicated in the additional information.

6. A method as claimed in claim 1, wherein the additional information contains an address of a distributor to which the input speech signal is conveyed, and is assigned to at least one speech recognizer of the plurality of speech recognizers.

7. A method as claimed in claim 1 wherein the information unit is realized as an HTML page and the additional information as an HTML tag.

8. A method as claimed in one of the claims 1 to 7, wherein there is multiple access to one HTML page by different clients, each client is assigned various address of the plurality of speech recognizers in the HTML tag.

9. A method as claimed in one of the claims 1 or 7, wherein the client has additional software for a feature extraction of a speech signal applied to the client which software is started when the HTML page include the HTML tag is downloaded.

10. A method as claimed in one or more of the claims 1 to 9, wherein a feature stream generated during the feature extraction with respect to the speech signal is applied to the at least one speech recognizer defined in the HTML at which speech recognizer executes the speech recognition and returns the recognition result to the client in dependence on indications contained in the HTML tag.

11. A method as claimed in claim 10, wherein the recognition results is returned to the server in dependence on indications contained in the HTML tag.

12. A server on which an information unit is stored and can be retrieved by a client, while the client can be coupled to one or more speech recognizers having an expected recognizable speech vocabulary associated with said information unit, wherein additional identifying information selected by the provider of the information unit is assigned to the information unit by the server for determining a combination between the client and said one or more speech recognizers for recognizing an input speech signal associated with said information unit, wherein the additional information includes information comprising one of a predetermined theme area, an indicator for specifying a speech recognizer, or parameters for allowing a speech recognizer to adapt to the speech input;

wherein the additional information and the information unit are combined by the server into a combined information unit and co-transferred during downloading so that the information unit is assigned a speech recognizer specially attuned to the downloaded combined information unit;

wherein the client is able to input speech before the contents of the information unit is coupled to the contents of the speech input, and wherein if more than one client invokes a same speech recognizer, at least one of the clients is assigned another speech recognizer according to alternative addresses of recognizers stored in a tag in the information unit.

13. A client which can be coupled to one or more speech recognizers through a communications network and which is provided for retrieving an information unit stored on a server and additional information is combined with the information unit for determining a combination between the client and said one or more speech recognizers having an expected recognizable speech vocabulary associated with said information unit and for recognizing an input speech signal, wherein the additional information includes information comprising one of a predetermined theme area, an indicator for specifying a speech recognizer, or parameters for allowing a speech recognizer to adapt to the speech input, and wherein the client receives the additional information and the information unit as a combined information unit that has been co-transferred during downloading so that the information unit is assigned a speech recognizer specially attuned to the downloaded combined information unit;

wherein the client is able to input speech before the contents of the information unit is coupled to the contents of the speech input, and wherein if more than one client invokes a same speech recognizer, at least one of the clients is assigned another speech recognizer according to alternative addresses of recognizers stored in a tag in the information unit.

* * * * *